United States Patent
Sugimoto et al.

(10) Patent No.: US 9,462,063 B2
(45) Date of Patent: Oct. 4, 2016

(54) NETWORK DEVICE SEARCH SYSTEM THAT ALLOWS INFORMATION PROCESSING TERMINAL TO IDENTIFY NETWORK DEVICE

(71) Applicant: KYOCERA Document Solutions Inc., Osaka (JP)

(72) Inventors: Kensaku Sugimoto, Osaka (JP); Takeshi Nakamura, Osaka (JP); Koji Sasadai, Osaka (JP); Koki Nakajima, Osaka (JP)

(73) Assignee: KYOCERA Document Solutions Inc. (JP)

( * ) Notice: Subject to any disclaimer, the term of this patent is extended or adjusted under 35 U.S.C. 154(b) by 549 days.

(21) Appl. No.: 13/911,249

(22) Filed: Jun. 6, 2013

(65) Prior Publication Data

US 2014/0006583 A1    Jan. 2, 2014

(30) Foreign Application Priority Data

Jun. 29, 2012  (JP) .................................. 2012-148013

(51) Int. Cl.
  *G06F 15/173*  (2006.01)
  *H04L 29/08*  (2006.01)
  *H04W 4/20*  (2009.01)

(52) U.S. Cl.
  CPC ............... *H04L 67/16* (2013.01); *H04W 4/20* (2013.01)

(58) Field of Classification Search
  None
  See application file for complete search history.

(56) References Cited

U.S. PATENT DOCUMENTS

| | | | | |
|---|---|---|---|---|
| 7,688,794 B2* | 3/2010 | Tredoux | .................. | H04L 67/18 340/10.3 |
| 8,165,036 B2* | 4/2012 | Kudo | .................. | H04L 63/0428 370/254 |
| 2007/0067413 A1* | 3/2007 | Nishio | .................. | G06F 9/4411 709/217 |
| 2007/0124447 A1 | 5/2007 | Ajitomi et al. | | |

(Continued)

FOREIGN PATENT DOCUMENTS

| | | |
|---|---|---|
| CN | 1542654 A | 11/2004 |
| EP | 1463237 A1 | 9/2004 |

(Continued)

OTHER PUBLICATIONS

"Reading a barcode from an LCD monitor using the IDAutomation Barcode Scanner". Posted Sep. 4, 2009 on <http://www.idautomation.com/kb/reading_barcode_on_LCD.html>.*
Office Action dated Jan. 28, 2016 from State Intellectual Property Office (SIPO) re Chinese Appl. No. 201310271099.4.

*Primary Examiner* — Scott B Christensen
(74) *Attorney, Agent, or Firm* — McDonnell Boehnen Hulbert and Berghoff LLP

(57) ABSTRACT

A network device search system includes an information processing terminal and a network device. The information processing terminal includes a search request unit configured to transmit a search request signal via a network; and a device information display unit configured to display, if notification information is attached to a received response signal, unique information for the network device included in the response signal in association with the notification information. The network device includes an input screen display unit configured to display an input screen in response to reception of the search request signal; and a search request response unit configured to return, when the notification information is input through the input screen, the response signal including the unique information for the network device by attaching the notification information thereto.

15 Claims, 18 Drawing Sheets

(56) References Cited

U.S. PATENT DOCUMENTS

| | | | |
|---|---|---|---|
| 2007/0133485 A1 | 6/2007 | Tredoux et al. | |
| 2007/0283152 A1 | 12/2007 | Kudo et al. | |
| 2008/0057990 A1* | 3/2008 | Fuccello | H04W 76/02 455/507 |
| 2009/0141303 A1 | 6/2009 | Azuchi | |
| 2010/0309501 A1* | 12/2010 | Hagiuda | H04L 41/22 358/1.13 |
| 2011/0026535 A1 | 2/2011 | Ajitomi et al. | |
| 2011/0164615 A1* | 7/2011 | Ito | H04L 29/12113 370/390 |
| 2013/0094048 A1* | 4/2013 | Sako | G06F 3/1222 358/1.14 |

FOREIGN PATENT DOCUMENTS

| | | |
|---|---|---|
| JP | 2004-202846 A | 7/2004 |
| JP | 2007-150835 A | 6/2007 |
| JP | 2007-206810 A | 8/2007 |
| JP | 2009-075758 | 4/2009 |
| JP | 2009-134423 A | 6/2009 |
| JP | 2010-050580 A | 3/2010 |
| JP | 2010-098640 | 4/2010 |
| JP | 2011-150647 A | 8/2011 |
| JP | 2012-085240 A | 4/2012 |
| JP | 2012-119984 A | 6/2012 |

* cited by examiner

NETWORK DEVICE SEARCH SYSTEM THAT ALLOWS INFORMATION PROCESSING TERMINAL TO IDENTIFY NETWORK DEVICE

REFERENCE TO RELATED APPLICATIONS

This application is based upon and claims the benefit of priority from the corresponding Japanese Patent Application No. 2012-148013, filed in the Japan Patent Office on Jun. 29, 2012, the entire contents of which are incorporated herein by reference.

BACKGROUND

I. Technical Field

The present disclosure relates to a network device search system for identifying a desired network device with which to communicate.

II. Description of the Related Art

When a user uses his or her mobile terminal to interact with a desired device (for example, printer) from among a plurality of devices connected to a network (such as an office LAN), the mobile terminal needs to identify the device and then establish a connection with the device.

To that end, there is known a method involving displaying all the devices existing within the network in a list on the mobile terminal and allowing the user to select a specific device from the list to establish a connection with the device.

Specifically, an application program for performing a search (hereinafter referred to as "search app") is started on the mobile terminal to transmit a search request signal.

Each device within the network returns a response signal including unique information for the respective devices, such as a host name and an IP address, and hence the mobile terminal can display the unique information for the devices in a list.

Accordingly, if the unique information for a device displayed in the list matches the unique information for the device desired by the user, the user may select the unique information to establish a connection to the desired device.

However, even if the unique information for the devices is transmitted, it is difficult for the user to identify the desired device based on the unique information (such as the host name and the IP address of the device, formed of an array of numbers and letters of the alphabet).

SUMMARY

A network device search system according to an embodiment of the present disclosure includes an information processing terminal and a network device. The information processing terminal includes a search request unit and a device information display unit. The search request unit is configured to transmit a search request signal via a network. The device information display unit is configured to display, if notification information is attached to a received response signal, unique information for the network device included in the response signal in association with the notification information. The network device includes an input screen display unit and search request response unit. The input screen display unit is configured to display an input screen in response to reception of the search request signal. The search request response unit is configured to return, when the notification information is input through the input screen, the response signal including the unique information for the network device by attaching the notification information thereto.

Further, a non-transitory computer-readable recording medium according to an embodiment of the present disclosure has stored thereon a network device search program executed by a computer of a network device and a computer of an information processing terminal. The network device search program includes a first program code, a second program code, a third program code, and a fourth program code. The first program code causes the computer of the information processing terminal to transmit a search request signal via a network. The second program code causes the computer of the information processing terminal to display, if notification information is attached to a received response signal, unique information for the network device included in the response signal in association with the notification information. The third program code causes the computer of the network device to display an input screen in response to reception of the search request signal. The fourth program code causes the computer of the network device to return, when the notification information is input through the input screen, the response signal including the unique information for the network device by attaching the notification information thereto.

Further, a network device search method according to an embodiment of the present disclosure includes (i) transmitting, by a search request unit of an information processing terminal, a search request signal via a network, (ii) displaying, by a device information display unit of the information processing terminal, if notification information is attached to a received response signal, unique information for the network device included in the response signal in association with the notification information, (iii) displaying, by an input screen display unit of the network device, an input screen in response to reception of the search request signal, and (vi) returning, by a search request response unit of the network device, when the notification information is input through the input screen, the response signal including the unique information for the network device by attaching the notification information thereto.

Additional features and advantages are described herein, and will be apparent from the following Detailed Description and the figures.

DETAILED DESCRIPTION

Described below are network device search systems according to first to fifth embodiments of the present disclosure.

Figure 1:
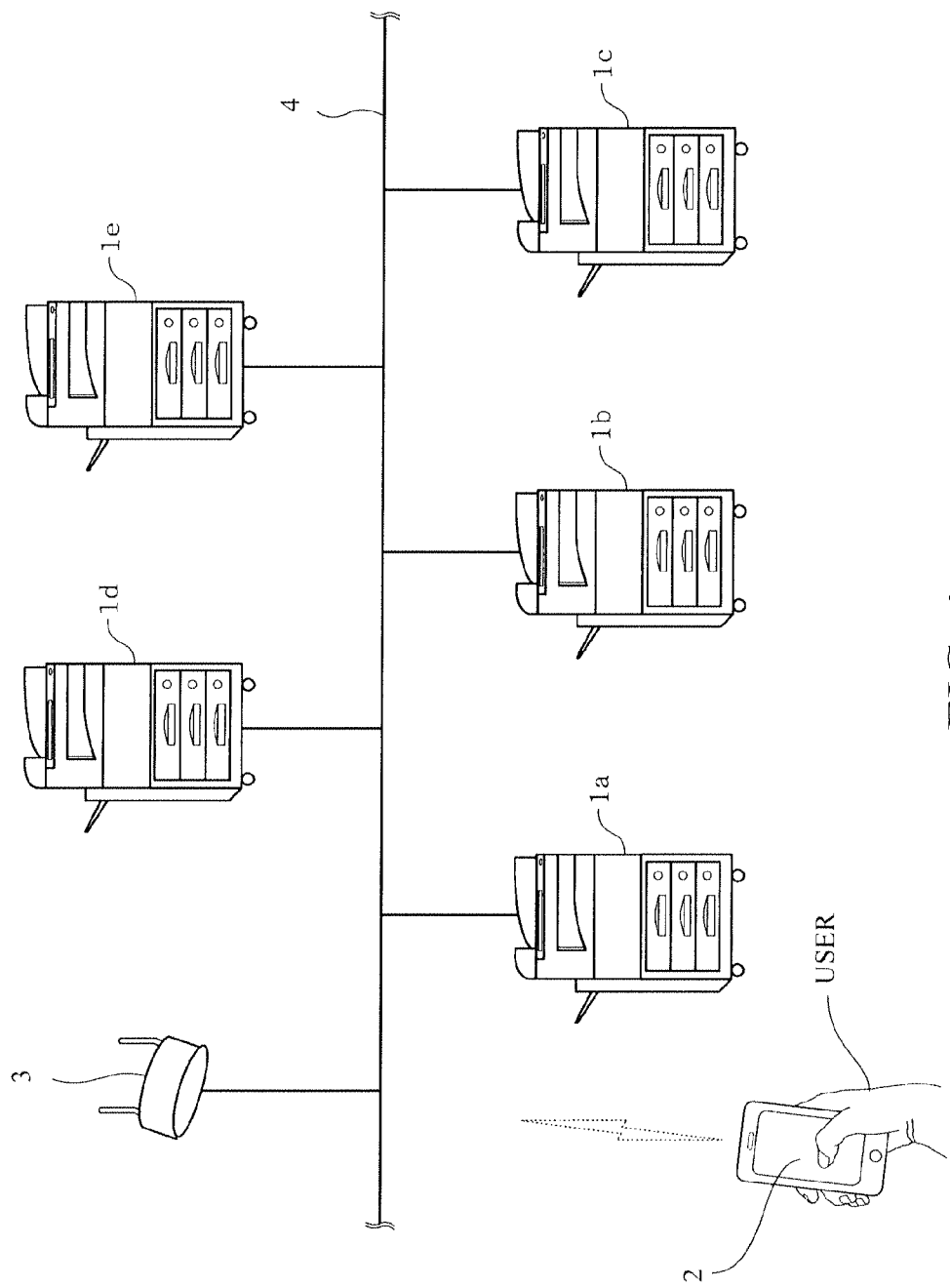
FIG. 1 illustrates a configuration of network device search systems according to first to fifth embodiments of the present disclosure.

FIG. 1 illustrates a configuration of the network device search systems according to the first to fifth embodiments of the present disclosure. As illustrated in FIG. 1, the network device search systems according to the first to fifth embodiments of the present disclosure each include a user's mobile terminal 2 and network devices 1a to 1e such as printers and MFPs (hereinafter also collectively referred to as "network device (MFP) 1"). In such a configuration, it is assumed that the user wishes to use the MFP 1a located in front of the user. Therefore, in the following description, in each embodiment, it is assumed that the user uses his or her mobile terminal 2 to establish communication with the MFP 1a by identifying the MFP 1a from among the network devices 1a to 1e and establishing a connection with MFP 1a. In the above-mentioned configuration, it is assumed that the mobile terminal 2 can be connected to a LAN 4 via a wireless LAN access point 3.

I. Mobile Terminal

Described next is a mobile terminal and a network device that form the network device search systems according to the first to fifth embodiments of the present disclosure.

Figure 2:
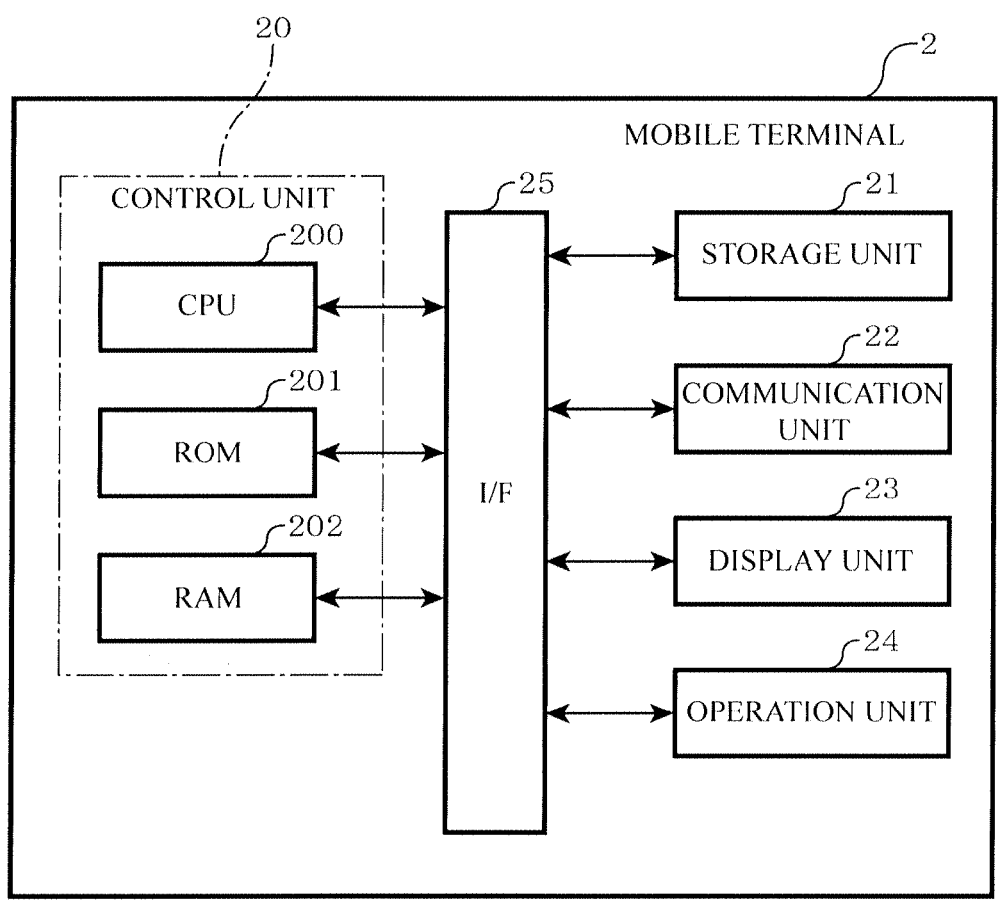
FIG. 2 illustrates a configuration of a mobile terminal of the network device search systems according to the first to fifth embodiments of the present disclosure.

FIG. 2 illustrates a configuration of a mobile terminal of the network device search systems according to the first to fifth embodiments of the present disclosure. The mobile terminal 2 is an example of an information processing terminal that can be moved, such as a cellular phone, a smartphone, or a personal digital assistant (PDA). By a search application such as WS-Discovery, in addition to a general communication control operation, the mobile terminal 2 can transmit a search request signal to all network devices 1 connected to the LAN 4 and receive a response signal corresponding to the search request signal to acquire/display unique information for the respective network devices 1.

Specifically, as illustrated in FIG. 2, the mobile terminal 2 includes, as a control unit 20, a central processing unit (CPU) 200 that controls the entire terminal and performs various kinds of calculations, a read only memory (ROM) 201 that stores a program and data, and a random access memory (RAM) 202 that temporarily stores the program and the data as a work area. The mobile terminal 2 also includes a storage unit 21, a communication unit 22, a display unit 23, and an operation unit 24. The storage unit 21 stores the search application and necessary data. The communication unit 22 transmits/receives necessary signals and data to/from the network device 1 via the wireless LAN access point 3 and the LAN 4. The display unit 23 displays the unique information and the like received from the network device 1. The operation unit 24 is formed of a numeric keypad and function keys, and functions to input the user's instruction. Those components are connected to one another through a bus interface (I/F) 25.

II. Network Device

Figure 3:
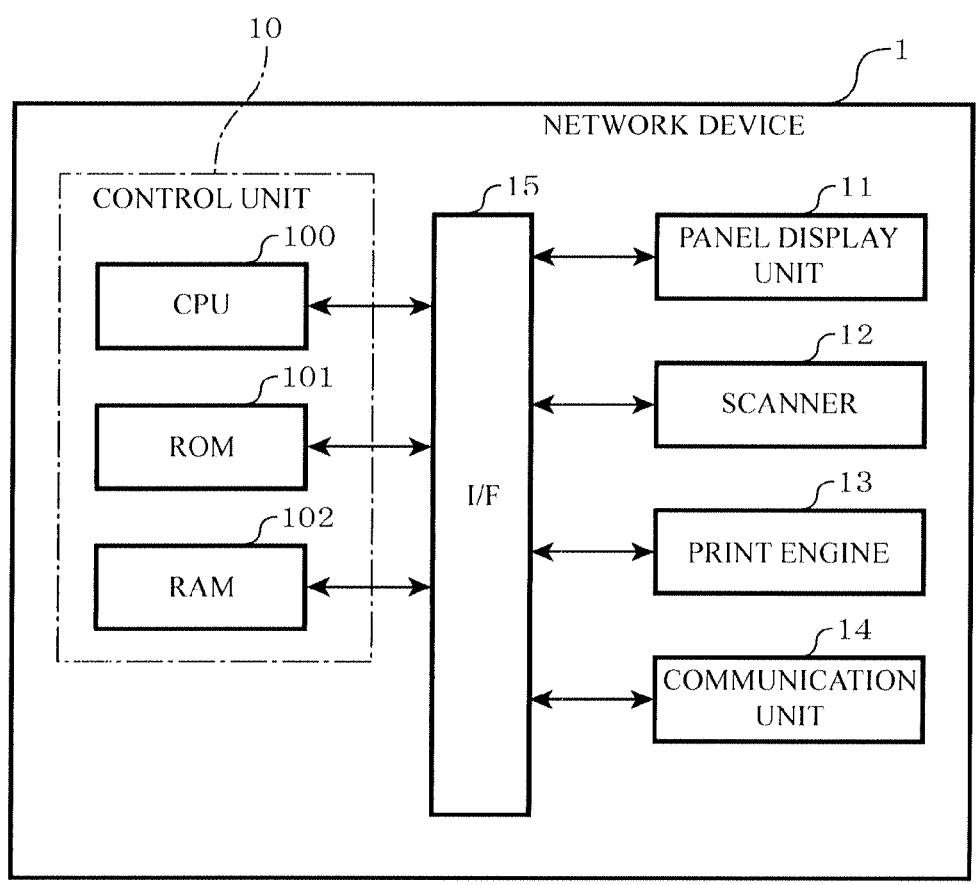
FIG. 3 illustrates a configuration of a network device of the network device search systems according to the first to fifth embodiments of the present disclosure.

FIG. 3 illustrates a configuration of a network device of the network device search systems according to the first to fifth embodiments of the present disclosure. The network devices 1 are devices having a communication function that are communicably connected to one another via the LAN 4, examples of which include MFPs, printers, and personal computers. The following description uses an MFP as an example of a network device 1.

The MFP 1 receives the search request signal transmitted from the mobile terminal 2 and returns the response signal in addition to operations for a copy function, a scanner function, a print function, and other such functions. The MFP 1 displays information and receives an input.

Specifically, as illustrated in FIG. 3, the MFP 1 includes, as a control unit 10, a CPU 100 that controls the entire device and performs various kinds of calculations, a ROM 101 that stores a program and data, and a RAM 102 that temporarily stores the program and the data as a work area. The MFP 1 also includes a panel display unit 11, a scanner 12, a print engine 13, and a communication unit 14. The panel display unit 11 is used to display various kinds of information and input various instructions. The scanner 12 reads an original or the like set on a flatbed (not shown). The print engine 13 uses a known electrophotographic process or the like to print on a recording medium. The communication unit 14 allows communications to/from an external portion. Those components are connected to one another through an I/F 15.

III. First Embodiment

A network device search system according to a first embodiment of the present disclosure is described next.

Figure 4:
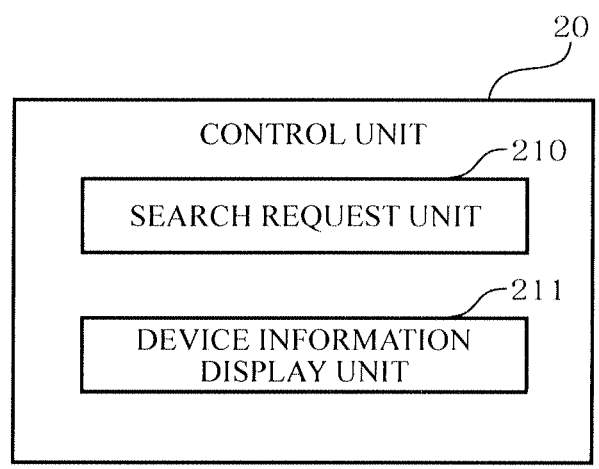
FIG. 4 is a functional block diagram of a mobile terminal of the network device search system according to the first embodiment of the present disclosure.

FIG. 4 is a functional block diagram of a mobile terminal 2 of the network device search system according to the first embodiment of the present disclosure. As illustrated in FIG.

4, the control unit 20 of the mobile terminal 2 includes a search request unit 210 and a device information display unit 211. The search request unit 210 transmits the search request signal to the network devices 1a to 1e belonging to a network (LAN 4). The device information display unit 211 displays, when the response signal corresponding to the search request signal is received, the unique information (such as IP address) for the network device 1 included in the response signal. When the response signal to which notification information is attached is received, the device information display unit 211 according to the first embodiment displays the unique information for the network device 1 included in the response signal and the associated notification information.

Figure 5:
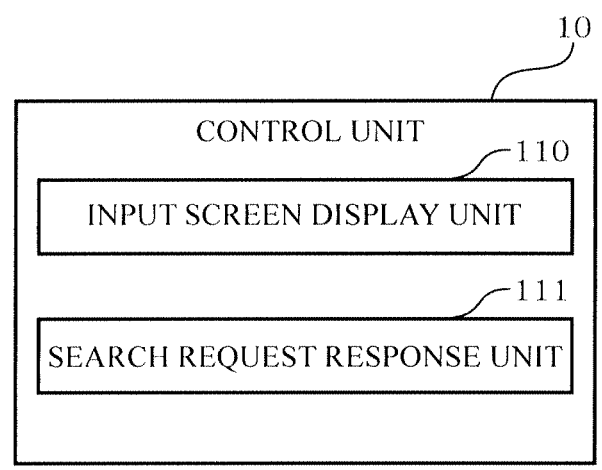
FIG. 5 is a functional block diagram of a network device of the network device search system according to the first embodiment of the present disclosure.

FIG. 5 is a functional block diagram of a network device 1 of the network device search system according to the first embodiment of the present disclosure. As illustrated in FIG. 5, the control unit 10 of the network device 1 includes an input screen display unit 110 and a search request response unit 111. The input screen display unit 110 displays an input screen (user information input screen P) in response to reception of the search request signal. The search request response unit 111 returns the response signal including the unique information for the network device 1. The search request response unit 111 according to the first embodiment returns, if the notification information is input through the input screen, the response signal by attaching the notification information to the response signal.

Here, in a case where the notification information is not input through the input screen within a specific waiting time period, the search request response unit 111 of the network device 1 can return the response signal without attaching the notification information thereto. In this case, the unique information for the network device (MFP 1a) to which the notification information has been input by the user's direct operation is displayed on the mobile terminal 2 in association with the notification information. Therefore, the network device to which the notification information has been input can be clearly distinguished from the network device to which the notification information has not been input, and even if a large number of network devices 1 exist, the user can easily identify the desired network device.

In contrast, the search request response unit 111 of the network device 1 may be inhibited from returning the response signal in the case where the notification information is not input through the input screen. In this case, only the unique information for the network device 1 to which the notification information has been input by the user's direct operation is displayed on the mobile terminal 2 in association with the notification information. Therefore, the network device to which the notification information has been input by the user can be clearly distinguished from the network device to which the notification information has been input by another person, and even if the notification information is input to multiple network devices 1, the user can easily identify the desired network device.

Note that the input screen display unit 110 erases the input screen when the specific waiting time period has elapsed since displaying the input screen. The waiting time period is set to a time period that allows the user to input the notification information (for example, 1 minute).

Described next is a network device search method according to the first embodiment of the present disclosure.

Figure 6:
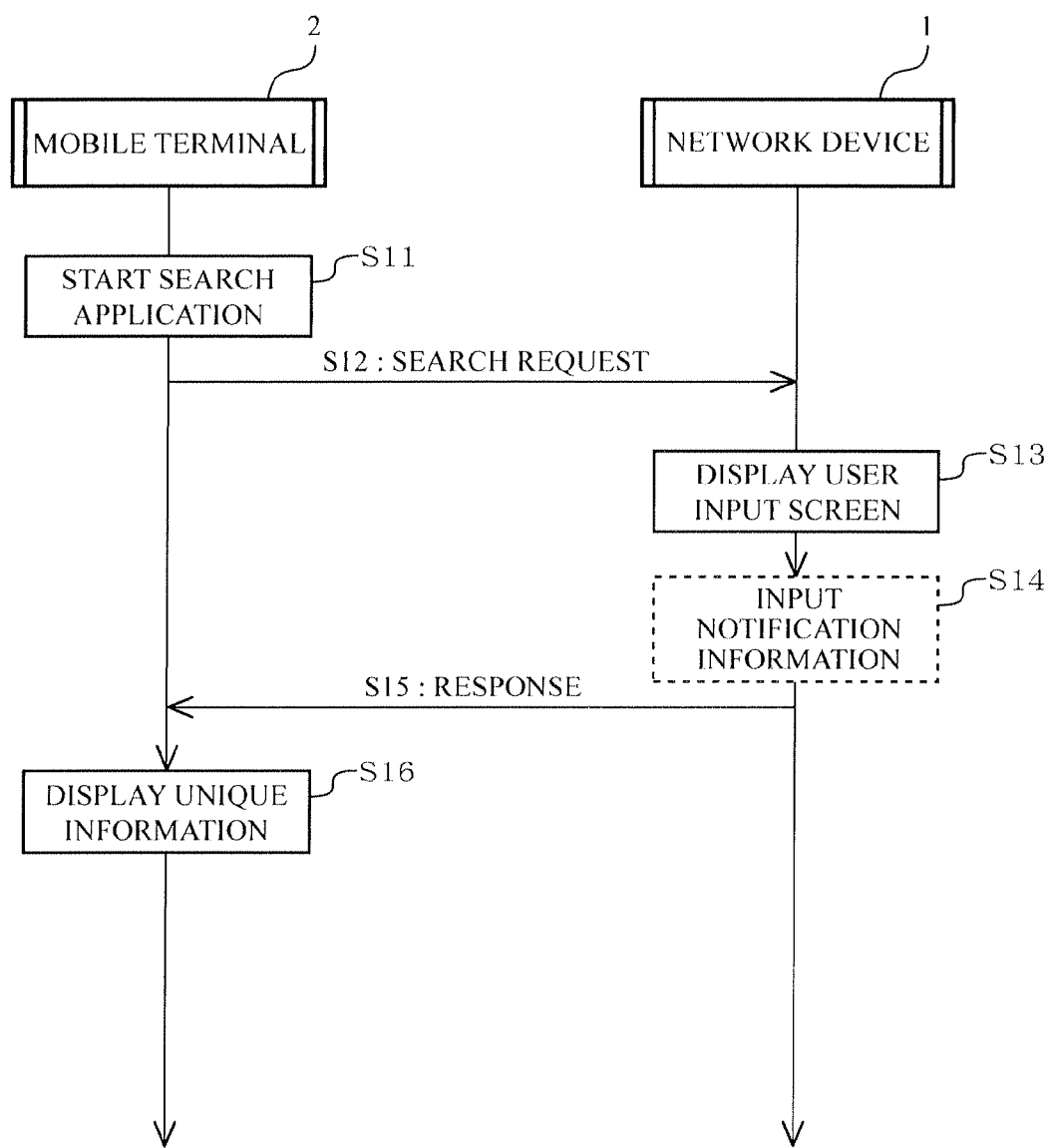
FIG. 6 illustrates a network device search sequence of the network device search system according to the first embodiment of the present disclosure.

FIG. 6 illustrates a network device search sequence of the network device search system according to the first embodiment of the present disclosure. It is assumed (in this embodiment and commonly in the other respective embodiments) that the user is in a position that allows the user to view/operate the panel display unit 11 of the MFP 1a.

First, the search application is started (S11) on the mobile terminal 2, and the search request signal is transmitted to the respective network devices 1a to 1e (S12). Specifically, in response to the startup of the search application or the subsequent operation, the search request unit 210 broadcasts the search request signal to the network devices 1a to 1e connected to the LAN 4.

Each of the network devices 1a to 1e that has received the search request signal displays a user input screen (S13). Specifically, on each of the network devices 1a to 1e, the input screen display unit 110 displays the user information input screen P on the panel display unit 11.

Figure 7:
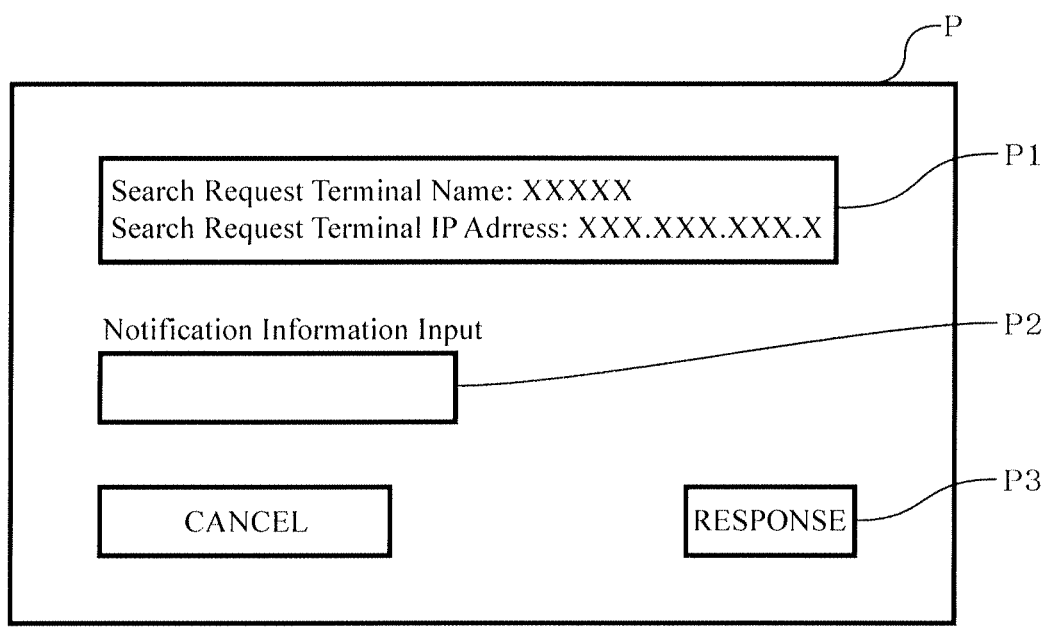
FIG. 7 illustrates an example of a user information input screen.

FIG. 7 illustrates an example of the user information input screen. A search terminal information display field P1 displays the unique information (for example, host name and IP address) for the mobile terminal 2 that performed a search request. The unique information for a transmission source (mobile terminal 2) included in the search request signal is extracted and displayed in the search terminal information display field P1. The user can recognize that the search request has been appropriately performed based on the fact that the unique information for his or her mobile terminal 2 is displayed in the search terminal information display field P1.

When the notification information is input to the MFP 1a (S14), the response signal (including the unique information for the MFP 1a) to which the notification information is attached is returned to the mobile terminal 2 (S15). Specifically, when the user inputs arbitrary notification information in a notification information input field P2 (of the user information input screen P displayed on the panel display unit 11 of the MFP 1a) and selects a response key P3, the search request response unit 111 returns the response signal, including the unique information for the MFP 1a, to the mobile terminal 2 by attaching the notification information thereto. An arbitrary character string input by the user may be any randomly-selected character string that can be recognized by the user, or may be a character string having a specific meaning such as a user name. Note that, if the mobile-terminal user does not input the notification information upon selecting the response key P3, a predefined character string or the like (such as "Default") may be automatically input as the notification information.

The user does not wish to use the network devices 1b to 1e other than the MFP 1a, and hence an input operation for the notification information is not performed on the network devices 1b to 1e.

If there is no input operation within the specific waiting time period, it is possible to erase the user information input screen P and return only the response signal. Alternatively, the MFP 1a may be configured to erase the user information input screen P and to be inhibited from returning the response signal if there is no input operation within the specific waiting time period.

When the mobile terminal 2 receives the response signal, the device information display unit 211 displays the unique information for the network device 1 included in the response signal (S16). If the response signal to which the notification information is attached is received, the device information display unit 211 displays the unique information for the network device 1 (the MFP 1a) included in the response signal, together with the notification information (S16). In this case, if the network devices 1 are configured to return only the response signals if there is no input operation within the specific waiting time period, the device information display unit 211 displays the unique information for the network devices 1*b* to 1*e* included in the response signals.

On the mobile terminal 2, only the unique information for the MFP 1*a* is displayed in association with the input notification information. This allows the user to easily identify the desired network device (MFP 1*a*) from a list of the network devices 1*a* to 1*e*. If the network devices 1 are configured to be inhibited from returning the response signal if there is no input operation within the specific waiting time period, the device information display unit 211 does not display the unique information for the network devices 1*b* to 1*e*.

Then, by performing an operation on a mobile terminal side to select the MFP 1*a* and establishing a connection thereto, the communication with the MFP 1*a* can be smoothly established.

As described above, according to the network device search system of the first embodiment of the present disclosure, the input screen display unit 110 displays the user information input screen P in response to the reception of the search request signal.

Subsequently, when the notification information is input from the MFP 1*a*, the search request response unit 111 returns to the mobile terminal 2 the response signal to which the notification information is attached. Then, when the mobile terminal 2 receives the response signal, the device information display unit 211 displays the unique information for the MFP 1*a* in association with the notification information. Therefore, the user can easily identify a desired network device (MFP 1*a*) from among the respective network devices 1*a* to 1*e* existing on the LAN 4, and can smoothly establish the connection thereto.

IV. Second Embodiment

Described next is a network device search system according to a second embodiment of the present disclosure.

Figure 8:
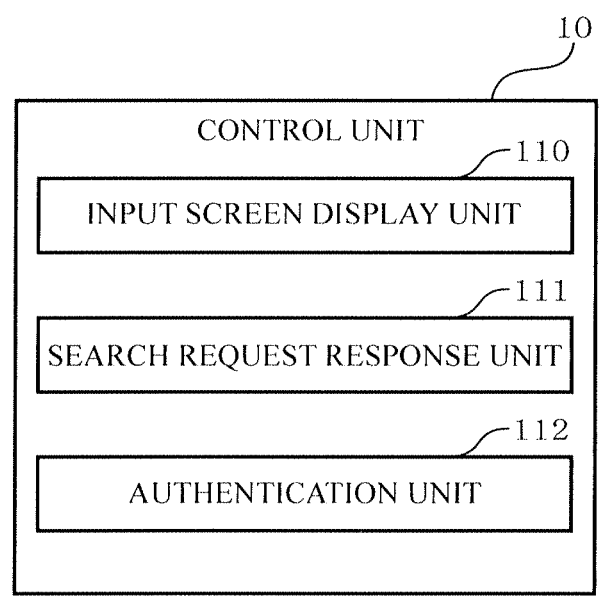
FIG. 8 is a functional block diagram of a network device of the network device search system according to the second embodiment of the present disclosure.

FIG. 8 is a functional block diagram of a network device of the network device search system according to the second embodiment of the present disclosure. Specifically, the control unit 10 according to the second embodiment differs from that in the first embodiment in that an authentication unit 112 is included therein. In other words, in the second embodiment, the authentication unit 112 authenticates authentication information on the user attached to the search request signal. The input screen display unit 110 displays the user information input screen P only if authentication is established. Therefore, when identification of the network device 1 is completed, it is possible to perform a so-called "login process." Accordingly, the second embodiment provides the same effects and convenience as the first embodiment, in addition to providing a usage mode that necessitates login. Note that the other components are the same as those of the first embodiment. Therefore, a detailed description of parts common to the first embodiment is omitted.

Figure 9:
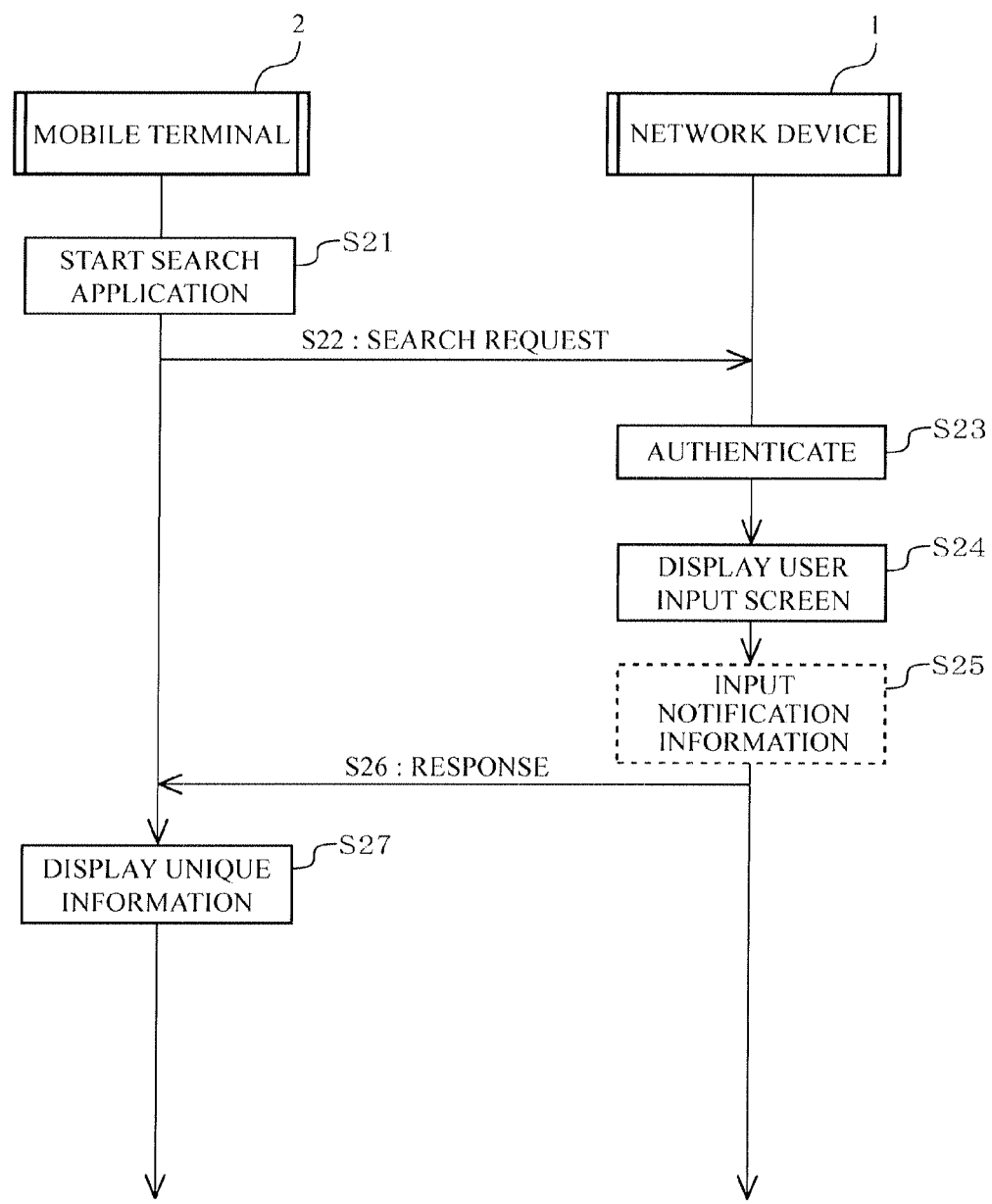
FIG. 9 illustrates a network device search sequence of the network device search system according to the second embodiment of the present disclosure.

FIG. 9 illustrates a network device search sequence of the network device search system according to the second embodiment of the present disclosure. As illustrated in FIG. 9, first, on the mobile terminal 2, the search application is started (S21), and the mobile terminal 2 transmits to each of the network devices 1*a* to 1*e* the search request signal to which the authentication information on the user is attached (S22). Specifically, the input screen for the authentication information is displayed on the display unit 23 of the mobile terminal 2 in response to the startup of the search application or the subsequent operation. The authentication information includes login information such as a user ID and a password and privilege information such as ticket information, and is verified in order to determine whether the user is authorized to use the network device. When the authentication information is input and an operation key is operated, the search request unit 210 broadcasts the search request signal to which the authentication information is attached to the respective network devices 1*a* to 1*e* connected to the LAN 4.

Each of the network devices 1*a* to 1*e*, if the search request signal is received, authenticates the authentication information attached to the search request signal (S23). Specifically, the authentication unit 112 verifies the authentication information attached to the search request signal against authentication-reference information that is registered. If there is matching information, the authentication is established as access from a valid user. Instead of having the authentication performed independently by each of the network devices 1*a* to 1*e* itself, the configuration may employ a network authentication in which the authentication is collectively performed by an authentication server (not shown) or the like connected to the LAN 4.

Note that, if the authentication is not established, error information may be returned to the mobile terminal 2.

If the authentication is established, the input screen display unit 110 displays the user information input screen P on the panel display unit 11 (S24). Specifically, in the configuration in which the network authentication is performed, the user information input screen is displayed on all the network devices 1*a* to 1*e*. Even in the configuration in which the authentication is performed for each of the network devices 1, if the authentication information on the user is registered in each thereof, the user information input screen P is displayed on all the network devices 1*a* to 1*e*.

The subsequent steps (S25 to S27) including steps relating to the input of the notification information are the same as the corresponding steps (S14 to S16) of the first embodiment. Therefore, the descriptions of these steps (S14 to S16) in the first embodiment are incorporated herein as the description of the corresponding steps (S25 to S27) in this embodiment.

However, the authentication is established, and hence the login process for the MFP 1*a* is performed during the above-mentioned steps (for example, while the notification information is being input).

As described above, according to the network device search system of the second embodiment of the present disclosure, if the search request signal is received from the mobile terminal 2, the authentication unit 112 authenticates the authentication information attached to the search request signal. If the authentication is established, the input screen display unit 110 displays the user information input screen P.

Subsequently, when the user inputs the notification information through the user information input screen P of the MFP 1*a*, the search request response unit 111 returns the response signal to which the notification information is attached to the mobile terminal 2.

Then, when the mobile terminal 2 receives the response signal, the device information display unit 211 displays the unique information for the MFP 1*a* in association with the notification information.

In this case, if the network devices 1 are configured to return only the response signals when there is no input operation within the specific waiting time period, the device information display unit 211 displays the unique information for the network devices 1b to 1e included in the response signals.

If the network devices 1 are configured to be inhibited from returning the response signal when there is no input operation within the specific waiting time period, the device information display unit 211 does not display the unique information for the network devices 1b to 1e. Therefore, the same effects as the first embodiment can also be produced in the usage mode that necessitates the authentication.

Next, the network device search system according to the second embodiment is described by taking an example of being applied to a billing service.

Referring to FIG. 9, the description is made by taking an example of being applied to a service in which, for example, image data on a photograph or the like stored in the mobile terminal 2 is printed by being transferred to a printing device set in a convenience store or the like in a wired or wireless manner.

Note that, it is assumed that the user can pay a charge necessary for printing through the mobile terminal 2 and can store billing information including the charge necessary for the print in the mobile terminal 2.

In the following description, the network device replaces the printing device. First, on the mobile terminal 2, when the search application is started up (S21), the search request unit 210 transmits to the printing device the search request signal to which the billing information is attached (S22). Specifically, in response to the startup of the search application or the subsequent operation, the input screen for the billing information is displayed on the display unit 23 of the mobile terminal 2. The billing information includes data necessary for the various kinds of calculations for the billing information, such as a screen for designating stored image data, a print size, and the number of sheets.

When the billing information is input and the operation key is operated, the search request unit 210 broadcasts the search request signal to which the billing information is attached to the respective network devices 1a to 1e connected to the LAN 4. That is, the search request unit 210 transmits the search request signal by adding the billing information thereto instead of the authentication information.

If the search request signal is received, the printing device determines whether or not the billing information is attached to the search request signal (S23). That is, the printing device determines the presence/absence of the billing information instead of the authentication unit 112 performing authentication. If the presence of the billing information is confirmed, the input screen display unit 110 of the printing device displays the user information input screen P on the panel display unit 11 (S24).

The subsequent steps (S25 to S27) including the steps relating to the input of the notification information are the same as the corresponding steps (S14 to S16) of the first embodiment. Therefore, the description of these steps (S14 to S16) in the first embodiment are incorporated herein as the description of the corresponding steps (S25 to S27) in this embodiment. After Step S26, the user can select a desired printing device from the display on the mobile terminal 2 and establish the connection thereto. After that, the mobile terminal 2 transmits the image data to the printing device through the communication unit 14. The printing device prints the received image data, and executes the billing process.

When printing of the image data is completed, the printing device notifies the mobile terminal 2 of a billing result.

When the billing result is received, the mobile terminal 2 displays an indication that printing of the photograph has been completed. In a case of a prepaid system, if there is a remaining balance, the mobile terminal 2 also displays remaining balance information.

In this manner, the network device search system according to the second embodiment can be applied to various embodiment modes such as a billing system, and has enhanced scalability.

V. Third Embodiment

Described next is a network device search system according to a third embodiment of the present disclosure.

Figure 10:
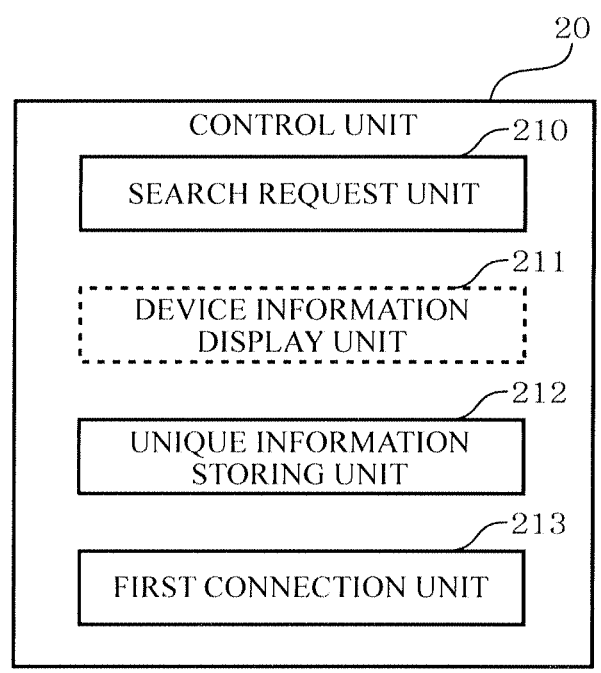
FIG. 10 is a functional block diagram of a mobile terminal of the network device search system according to the third embodiment of the present disclosure.
Figure 11:
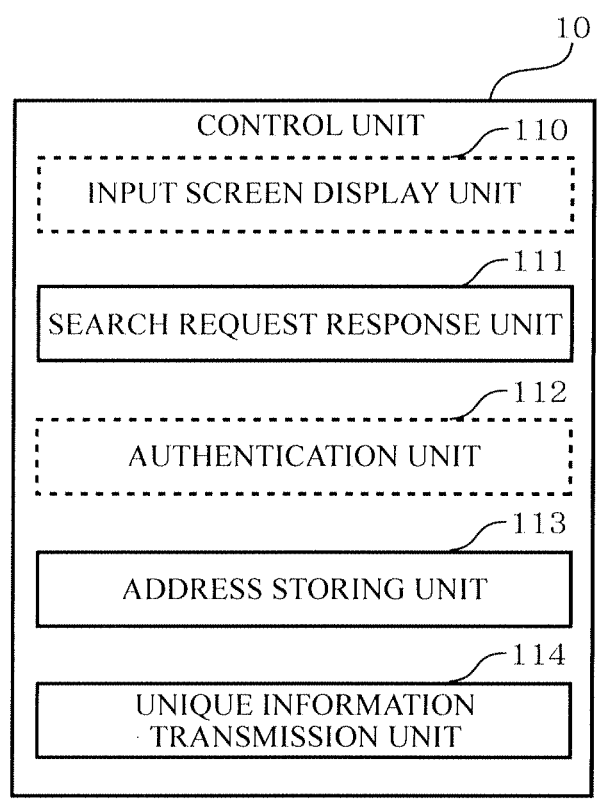
FIG. 11 is a functional block diagram of a network device of the network device search system according to the third embodiment of the present disclosure.

FIG. 10 is a functional block diagram of a mobile terminal of the network device search system according to the third embodiment of the present disclosure. FIG. 11 is a functional block diagram of a network device of the network device search system according to the third embodiment of the present disclosure.

As illustrated in FIG. 10, the control unit 20 according to the third embodiment is different from that in the first embodiment in that a unique information storing unit 212 and a first connection unit 213 are included therein. Further, as illustrated in FIG. 11, the control unit 10 according to the third embodiment is different from that in the second embodiment in that an address storing unit 113 and a unique information transmission unit 114 are included therein.

Specifically, in the third embodiment, when each of the network devices 1a to 1e receives the search request signal, the address storing unit 113 extracts an address (such as IP address) of the mobile terminal 2 from the search request signal and stores the address. Subsequently, the unique information transmission unit 114 transmits the unique information for the MFP 1a to the mobile terminal 2 separately from the response signal. Then, when the mobile terminal 2 receives the unique information, the unique information storing unit 212 stores the unique information transmitted separately from the response signal.

When the search request signal is received, the input screen display unit 110 of each of the network devices 1a to 1e displays the user information input screen P. The search request response unit 111 returns the response signal including the unique information for the respective network device. Here, when the user inputs the notification information through the user information input screen P of the MFP 1a, the search request response unit 111 returns the response signal including the unique information for the MFP 1a to the mobile terminal 2 by attaching the notification information thereto. If the unique information included in the response signal to which the notification information is attached is included in the stored unique information, the first connection unit 213 of the mobile terminal 2 establishes the connection to the MFP 1a.

According to such a configuration, it is possible to automatically perform the identification of the MFP 1a and the connection thereto. Therefore, the user can quickly start to use the MFP 1a without performing a selection operation, a connection operation, or the like necessary for the connection to the MFP 1a.

Note that the other components are the same as those of the first or second embodiment. Therefore, a detailed description of parts common to the first or second embodiment is omitted.

Figure 12:
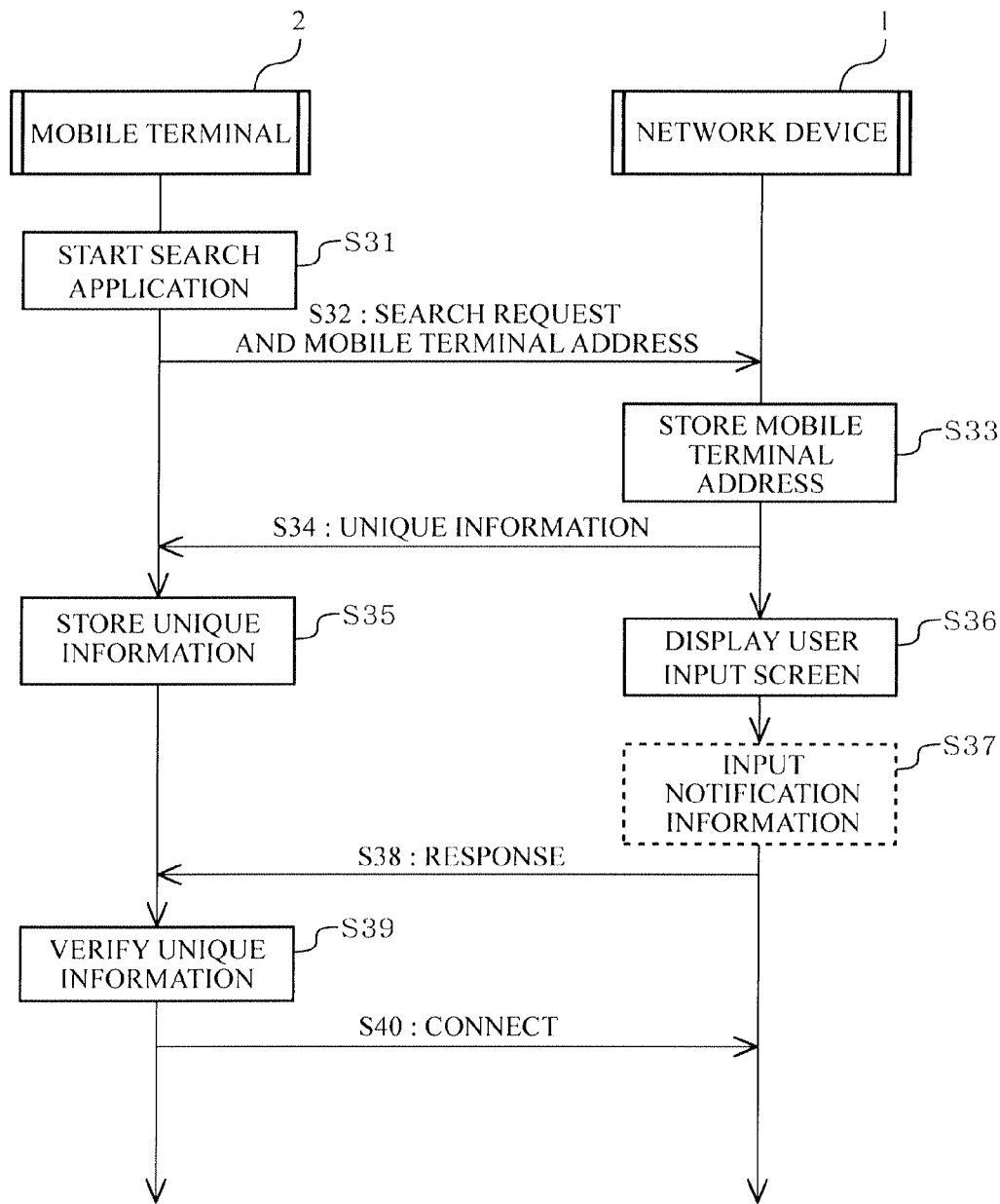
FIG. 12 illustrates a network device search sequence of the network device search system according to the third embodiment of the present disclosure.

FIG. 12 illustrates a network device search sequence of the network device search system according to the third embodiment of the present disclosure. As illustrated in FIG.

12, first, on the mobile terminal 2, the search application is started (S31), and the mobile terminal 2 transmits the search request signal to each of the network devices 1a to 1e (S32). Specifically, in response to the startup of the search application or the subsequent operation, the search request unit 210 broadcasts the search request signal including the address of the transmission source (mobile terminal 2) to the network devices 1a to 1e connected to the LAN 4.

If each of the network devices 1a to 1e receives the search request signal, the address storing unit 113 extracts the address of the mobile terminal 2 from the search request signal and stores the address (S33). The unique information transmission unit 114 transmits the unique information for the network devices 1a to 1e to the mobile terminal 2 (S34). When receiving the unique information from each of the network devices 1a to 1e, the mobile terminal 2 extracts the unique information for each of the network devices 1a to 1e therefrom and stores the unique information (S35).

Each of the network devices 1a to 1e that has received the search request signal displays the user input screen (S36). Specifically, on each of the network devices 1a to 1e, the input screen display unit 110 displays the user information input screen P on the panel display unit 11.

The subsequent steps (S37 and S38) including the steps relating to the input of the notification information are the same as the corresponding steps (S14 and S15) of the first embodiment. Therefore, the descriptions of these steps (S14 to S15) in the first embodiment are incorporated herein as the description of the corresponding steps (S37 and S38) in this embodiment.

Note that, as a destination of the mobile terminal 2, each of the network devices 1a to 1e refers to the address stored in Step S33.

When receiving the response signal to which the notification information is attached, the mobile terminal 2 verifies the unique information included in the response signal against the unique information for each of the network devices 1a to 1e stored in Step S35 (S39). If the mobile terminal 2 verifies that the received unique information is included in the stored unique information, the first connection unit 213 establishes the connection to the network device (MFP 1a) (S40). Specifically, if included in the unique information, the address (IP address) is used as destination information to establish the connection thereto. Further, even if the address is not included in the unique information, the transmission source (which is the address of the MFP 1a) is extracted from header information on a frame received when the unique information is received, and is used as the destination information to establish the connection thereto. In this case, if the mobile terminal 2 receives a plurality of response signals to which the notification information is attached (for example, if another user happens to input the notification information to any one of the network devices 1b to 1e), the notification information may be input from the mobile terminal 2 and verified against the notification information attached to the response signal, to thereby identify the network device to be connected thereto.

As described above, according to the network device search system of the third embodiment of the present disclosure, when each of the network devices 1a to 1e receives the search request signal, the unique information transmission unit 114 returns the unique information individually to the mobile terminal 2, and when the mobile terminal 2 receives the unique information, the unique information storing unit 212 stores the received unique information. Subsequently, in response to the user's operation performed on the MFP 1a, the search request response unit 111 transmits the response signal including the unique information for the MFP 1a to the mobile terminal 2.

When receiving the response signal to which the notification information is attached, the mobile terminal 2 verifies the unique information included in the response signal against the stored unique information for each of the network devices 1a to 1e. Then, if the received unique information is included in the stored unique information, the first connection unit 213 establishes the connection to the MFP 1a. In other words, the network device search system according to the third embodiment performs the identification of the MFP 1a and the connection thereto in a series of steps. Therefore, the user can use the MFP 1a by establishing the connection thereto more easily and more smoothly.

Thus, according to the network device search system of the third embodiment, it is possible to provide further enhanced convenience.

VI. Fourth Embodiment

Described next is a network device search system according to a fourth embodiment of the present disclosure.

Figure 13:
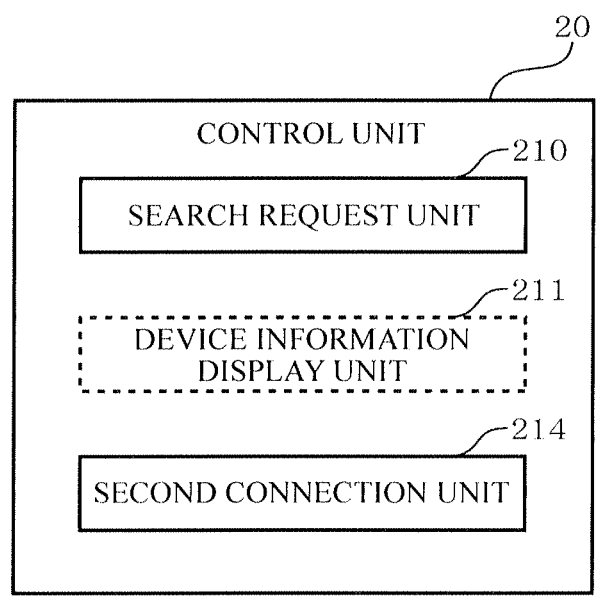
FIG. 13 is a functional block diagram of a mobile terminal of the network device search system according to the fourth embodiment of the present disclosure.
Figure 14:
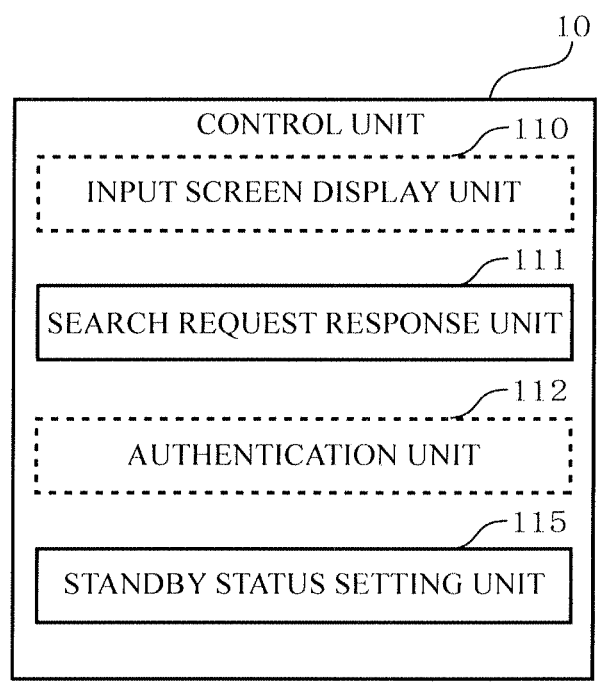
FIG. 14 is a functional block diagram of a network device of the network device search system according to the fourth embodiment of the present disclosure.

FIG. 13 is a functional block diagram of a mobile terminal of the network device search system according to the fourth embodiment of the present disclosure. FIG. 14 is a functional block diagram of a network device of the network device search system according to the fourth embodiment of the present disclosure.

As illustrated in FIG. 13, the control unit 20 according to the fourth embodiment is different from that in the first embodiment in that second connection unit 214 is included therein. Further, as illustrated in FIG. 14, the control unit 10 according to the fourth embodiment is different from that in the second embodiment in that a standby status setting unit 115 is included therein. Specifically, in the fourth embodiment, the standby status setting unit 115 sets the MFP 1a to a standby status in response to the user's operation performed on the MFP 1a. Here, the search request response unit 111 returns the response signal only when the search request signal is received while each of the network devices 1a to 1e is set to the standby status, and does not return the response signal even if the search request signal is received while each of the network devices 1a to 1e is set to the standby status. Then, when the mobile terminal 2 receives the response signal, the second connection unit 214 establishes the connection to the transmission source of the response signal.

According to such a configuration, in the same manner as the third embodiment, the identification of the MFP 1a and the connection thereto are performed in a series of steps. Therefore the fourth embodiment can provide the user with enhanced convenience. The network device search system according to the fourth embodiment does not involve the storing step and involves a small number of processing steps in the series of processes. Therefore the fourth embodiment can allow for smooth operation.

Note that, the other components are the same as those of the first or second embodiment. Therefore, a detailed description of parts common to the first or second embodiment is omitted.

Figure 15:
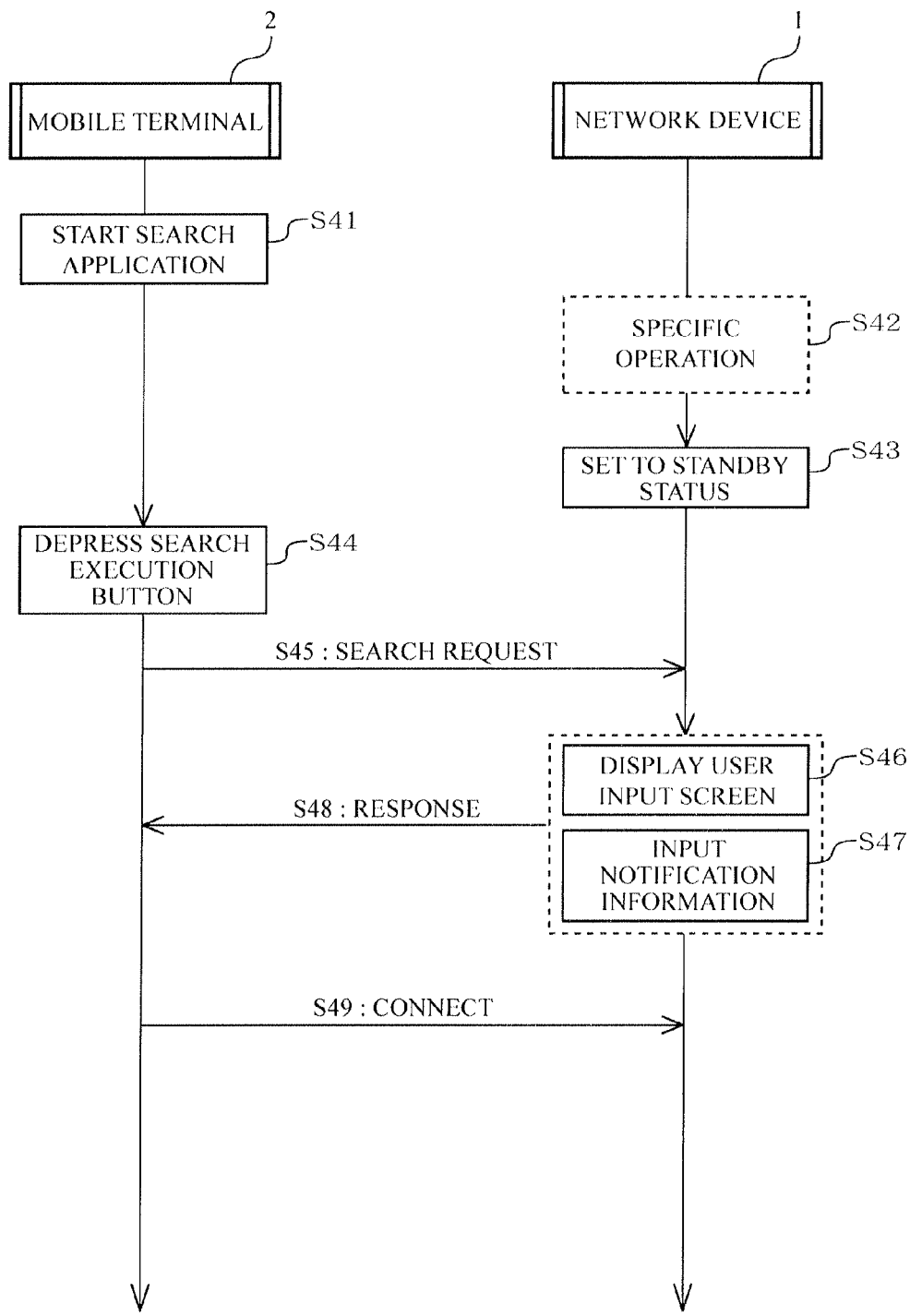
FIG. 15 illustrates a network device search sequence of the network device search system according to the fourth embodiment of the present disclosure.

FIG. 15 illustrates a network device search sequence of the network device search system according to the fourth embodiment of the present disclosure. As illustrated in FIG. 15, first, on the mobile terminal 2, the search application is started (S41). In response to the startup of the search application, an operation procedure to be followed on the MFP 1a is displayed on the display unit 23 of the mobile terminal 2, and a search execution button is displayed as an operation key for executing the search request. The user follows the operation procedure to perform a specific operation on the MFP 1a (S42). In response to the operation, the MFP 1a sets itself to the standby status (S43). Subsequently, the user depresses the search execution button on the mobile terminal 2 (S44).

When the search execution button is depressed, the search request unit 210 transmits the search request signal to each of the network devices 1a to 1e (S45).

Here, of the network devices 1a to 1e that have received the search request signal (S46), the user input screen is displayed on the network device set to the standby status. Specifically, on the MFP 1a, the input screen display unit 110 displays the user information input screen P on the panel display unit 11. On the other hand, the input screen is not displayed on the network device that is not set to the standby status.

The subsequent steps (S47 and S48) including the steps relating to the input of the notification information are the same as the corresponding steps (S14 and S15) of the first embodiment. Therefore, the description of these steps (S14 to S15) in the first embodiment is incorporated herein as the description of the corresponding steps (S47 and S48) in this embodiment. In other words, the MFP 1a that displays the user input screen can return the response signal, while the other network devices 1b to 1e do not return the response signals.

When the mobile terminal 2 receives the response signal to which the notification information is attached, the mobile terminal 2 establishes a connection to the transmission source (MFP 1a) of the response signal (S49). Specifically, the address of the MFP 1a (being the transmission source) is extracted from the header information on the received frame of the response signal to which the notification information is attached, and is used as the destination information. Here, if the mobile terminal 2 receives a plurality of response signals to which the notification information is attached (for example, if another user happens to input the notification information to any one of the network devices 1b to 1e after setting to the standby status), the notification information may be input from the mobile terminal 2 and verified against the notification information attached to the response signal, to thereby identify the network device to be connected thereto.

As described above, according to the network device search system of the fourth embodiment of the present disclosure, only the network device (MFP 1a) that is set to the standby status by the standby status setting unit 115 responds to the search request, while the network devices 1b to 1e that are not set to the standby status do not respond to the search request. Then, when the mobile terminal 2 receives the response signal to which the notification information is attached, the second connection unit 214 establishes the connection to the transmission source (MFP 1a) of the response signal. Therefore, according to the network device search system of the fourth embodiment, the same effects as those in the third embodiment can be produced in that the identification of the network device and the connection thereto are automatically performed. In addition, the storing step is not involved, and the number of processing steps in the series of processes is small. Therefore the fourth embodiment can enable smooth operation.

VII. Fifth Embodiment

Described next is a network device search system according to a fifth embodiment of the present disclosure.

Figure 16:
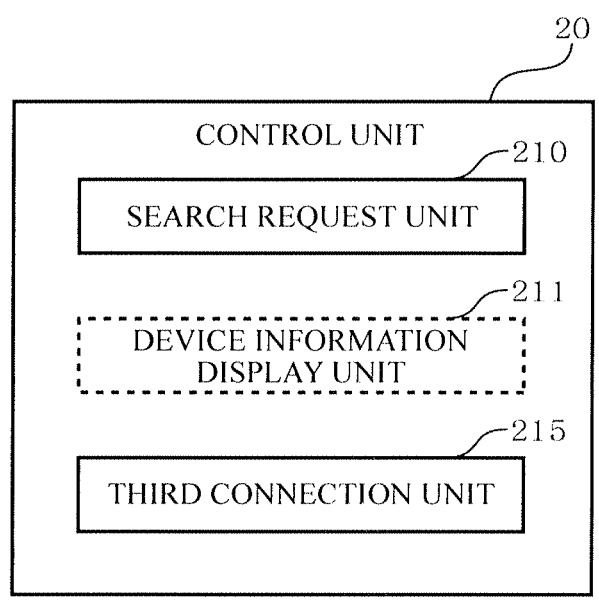
FIG. 16 is a functional block diagram of a mobile terminal of the network device search system according to the fifth embodiment of the present disclosure.
Figure 17:
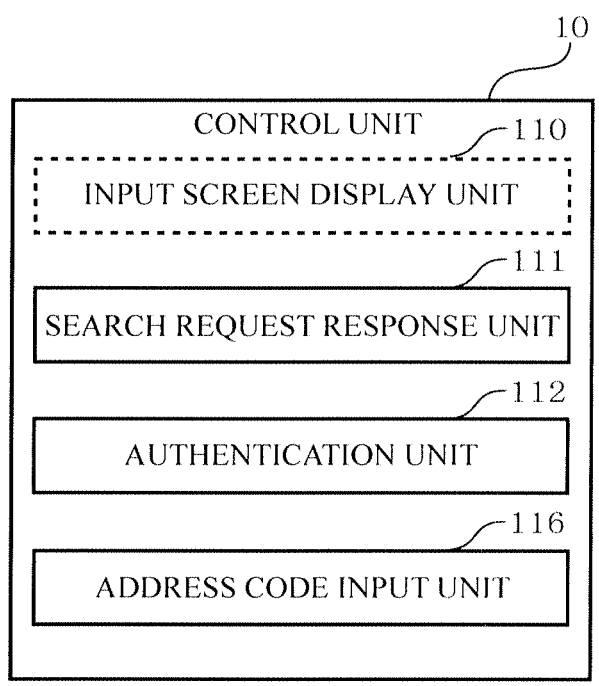
FIG. 17 is a functional block diagram of a network device of the network device search system according to the fifth embodiment of the present disclosure.

FIG. 16 is a functional block diagram of a mobile terminal of the network device search system according to the fifth embodiment of the present disclosure. FIG. 17 is a functional block diagram of a network device of the network device search system according to the fifth embodiment of the present disclosure.

As illustrated in FIG. 16, the control unit 20 according to the fifth embodiment is different from the first embodiment in that a third connection unit 215 is provided therein. Further, as illustrated in FIG. 17, the control unit 10 according to the fifth embodiment is different from the second embodiment in that an address code input unit is provided therein. Specifically, in the fifth embodiment, in response to receiving the search request signal from the mobile terminal 2, the address code input unit 116 of the MFP 1a inputs an address code (two-dimensional bar code) of the address of the MFP 1a to the user input screen as the notification information, and keeps the address code displayed. The mobile terminal 2 reads the address code to acquire the address. Further, the search request response unit 111 of the MFP 1a returns response information including the unique information for the MFP 1a to the mobile terminal by attaching the notification information thereto.

The mobile terminal 2 verifies the address of the received notification information against the read address, and if the two addresses match each other, transmits the authentication information on the user. When the MFP 1a receives the authentication information on the user, the authentication unit 112 authenticates the authentication information, and returns the response signal by attaching an authentication result thereto. Then, the mobile terminal 2 that has received the response signal establishes the connection to the MFP 1a if the authentication result is valid, and does not establish the connection if the authentication result is not valid.

According to such a configuration, in the same manner as the third and fourth embodiments, the identification of the MFP 1a and the connection thereto are performed in a series of processes. Therefore the fifth embodiment can provide the user with enhanced convenience. Further, the same effects can also be produced in the usage mode that necessitates the authentication. Note that the other components are the same as those of the first or second embodiment. Therefore, a detailed description of parts common to the first or second embodiment is omitted.

Figure 18:
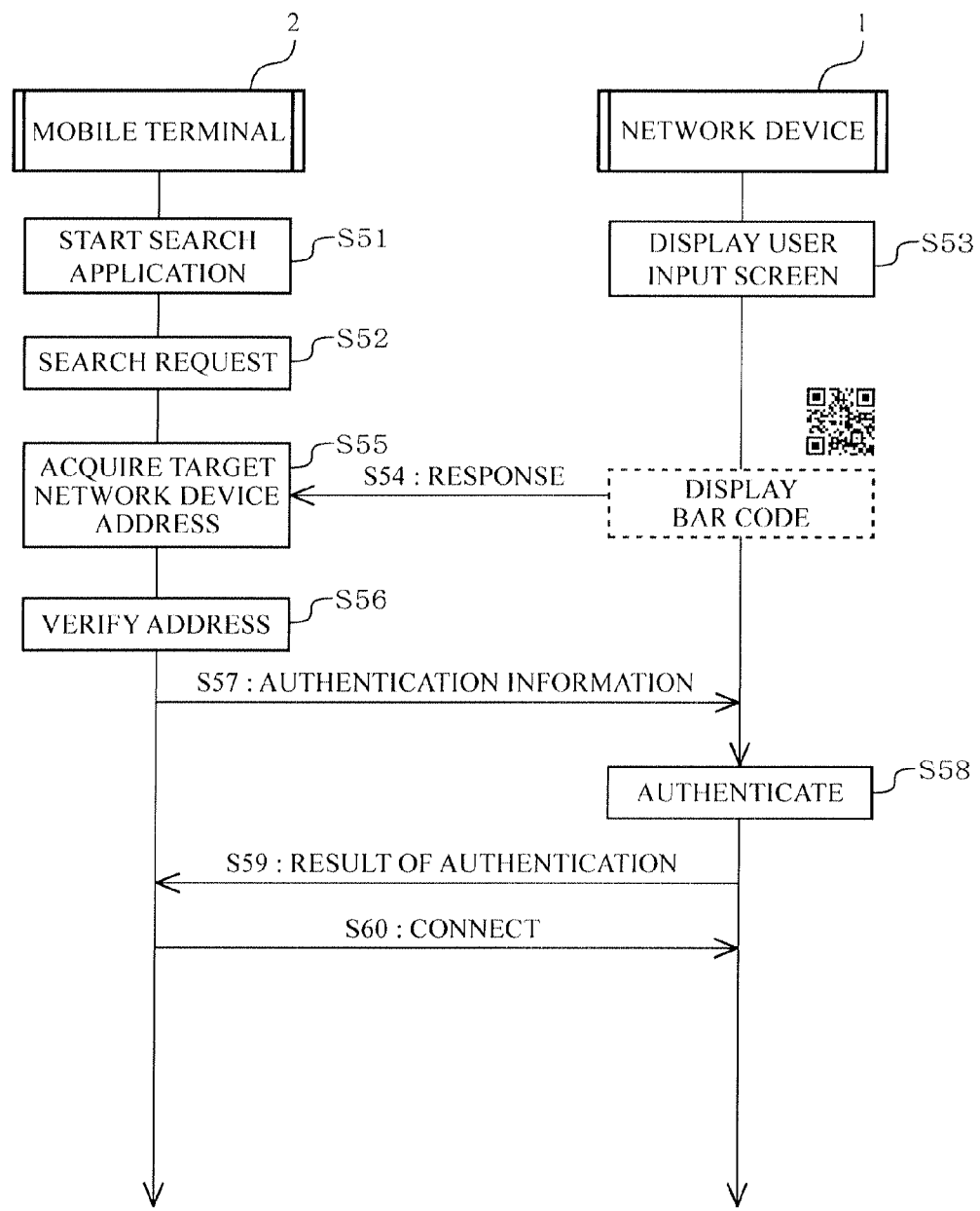
FIG. 18 illustrates a network device search sequence of the network device search system according to the fifth embodiment of the present disclosure.

FIG. 18 illustrates a network device search sequence of the network device search system according to the fifth embodiment of the present disclosure. As illustrated in FIG. 18, first, on the mobile terminal 2, the search application is started (S51), and the mobile terminal 2 transmits the search request signal to each of the network devices 1a to 1e (S52). Further, in response to the startup of the search application, the mobile terminal 2 displays a bar code reading screen on the display unit 23.

When the search request signal is received, the input screen display unit 110 of each of the network devices 1a to 1e displays the user information input screen P on the panel display unit 11 (S53). At this time, the address code input unit 116 inputs the two-dimensional bar code, which is the address code of the respective network device, to the user information input screen P. The input screen display unit 110 displays the two-dimensional bar code of the address (such as IP address) of the respective network device on the panel display unit 11.

In the same manner as the first embodiment, the search request response unit 111 returns to the mobile terminal 2 the response signal to which the notification information is attached (S54). The address code is the notification information attached to the response signal at this time. The user uses the mobile terminal 2 to perform an operation for reading the two-dimensional bar code displayed on the MFP 1*a*. The mobile terminal 2 acquires the address of a target network device (MFP 1*a*) by reading the two-dimensional bar code (S55). The mobile terminal 2 verifies the address corresponding to the received response signal against the read address (S56).

As a result of the verification, if the two addresses match each other, the mobile terminal 2 displays the input screen for the authentication information. The user uses the mobile terminal 2 to input the authentication information and perform a transmission operation therefor. Accordingly, the search request unit 210 transmits the authentication information to the MFP 1*a* based on the acquired address (S57).

When the search request signal is received, the MFP 1*a* authenticates the authentication information attached to the search request signal (S58). The MFP 1*a* returns the response signal by attaching a result (established/rejected) of the authentication thereto (S59).

When the response signal is received, the mobile terminal 2 acquires the result of the authentication. On the mobile terminal 2, the third connection unit 215 establishes the connection to the MFP 1*a* if the authentication result is "established" (S56). Note that, if the authentication result is "rejected," the connection is not established. In this case, the error information or the like can be displayed.

As described above, according to the network device search system of the fifth embodiment of the present disclosure, the connection to a specific network device can be smoothly established by the user's simple operation. In particular, even when the authentication is necessary, the identification of the device, the connection thereto, and the login thereto are included in a series of steps. Therefore the fifth embodiment can provide further enhanced convenience.

The embodiments of the present disclosure have been described above, but it is to be understood that various changes can be made and that the present disclosure is not limited only to the above-mentioned embodiments. For example, in the third and fourth embodiments, in the same manner as the second embodiment, the user information input screen P can be displayed if the authentication performed by the authentication unit 112 is established. Further, in the third to fifth embodiments, on the mobile terminal side, the unique information for the network device (MFP 1*a*) can be displayed in association with the notification information. Therefore, while establishing the connection to a desired network device, it is possible to confirm whether or not the connection is correct. The present disclosure can be applied to the MFP, the printer, the personal computer, and other such network device having a communication function.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A network device search system, comprising:
an information processing terminal, the information processing terminal configured to:
first, broadcast, via a network, to each of a plurality of network devices a search request signal, the search request signal including an identifier of the information processing terminal;
fourth, receive, responsive to the broadcast search request signal, a first response signal from the plurality of network devices, the response signal including unique information corresponding to each of the plurality of network devices including corresponding unique information of a first network device;
seventh, receive, responsive to an input of the notification information on an input screen of the first network device, a second response signal from the first network device of the plurality of network devices, the second response signal including the notification information;
eighth, verify that the corresponding unique information of the first network device matches the received notification information; and
ninth, based on the corresponding unique information of the first network device matching the received notification information, establish a connection to the first network device; and
the first network device, the first network device configured to:
second, responsive to the search request signal, store the identifier of the information processing terminal;
third, responsive to the search request signal, transmit a corresponding first response signal including the corresponding unique information of the first network device;
fifth, provide, based on the search request signal, an input screen to accept an input of the notification information; and
sixth, transmit, via the network responsive to the input of notification information, the second response signal.

2. The network device search system according to claim 1, wherein the first network device is further configured to:
transmit the search request signal and user authentication information via the network; and
provide the input screen if authentication of the user authentication information received from the information processing terminal is established.

3. The network device search system according to claim 1, wherein the first network device is further configured to erase the input screen if the notification information is not input through the input screen.

4. The network device search system according to claim 1, wherein the first network device is further configured to:
set the first network device to a standby status in response to an operation; and
transmit the response signal if the search request signal is received while the first network device is set to the standby status, and to be inhibited from transmitting the response signal if the search request signal is received while the first network device is not set to the standby status; and
wherein the information processing terminal is further configured to establish, when the response signal is received, a connection to the first network device that has transmitted the response signal.

5. The network device search system according to claim 1, wherein the first network device is further configured to:
transmit, along with the response signal, a user authentication result received along with the search request signal; and wherein the information processing terminal is further configured to establish a connection to the first network device based on the authentication result received from the first network device along with the response signal.

6. A non-transitory computer-readable recording medium comprising a network device search program stored thereon executable by a computer of a first network device and a computer of an information processing terminal, the network device search program comprising:

first program code to cause the computer of the information processing terminal to:

first, broadcast, via a network, to each of a plurality of network devices a search request signal, the search request signal including an identifier of the information processing terminal;

fourth, receive, responsive to the broadcast search request signal, a first response signal from the plurality of network devices, the response signal including unique information corresponding to each of the plurality of network devices including corresponding unique information of a first network device;

seventh, receive, responsive to an input of the notification information on an input screen of the first network device, a second response signal from the first network device of the plurality of network devices, the second response signal including the notification information;

eighth, verify that the corresponding unique information of the first network device matches the received notification information; and ninth, based on the corresponding unique information of the first network device matching the received notification information, establish a connection to the first network device; and second program code to cause the computer of the first network device to:

second, responsive to the search request signal, store the identifier of the information processing terminal;

third, responsive to the search request signal, transmit a corresponding first response signal including the corresponding unique information of the first network device;

fifth, provide, based on the search request signal, an input screen to accept an input of the notification information; and sixth, transmit, via the network responsive to the input of notification information, the second response signal.

7. The non-transitory computer-readable recording medium according to claim 6, wherein:

the first program code further causes the computer of the information processing terminal to transmit the search request signal and user authentication information via the network; and the second program code further causes the computer of the first network device to display the input screen if authentication of the user authentication information received from the information processing terminal is established.

8. The non-transitory computer-readable recording medium according to claim 6, wherein the second program code further causes the computer of the first network device to erase the input screen if the notification information is not input through the input screen.

9. The non-transitory computer-readable recording medium according to claim 6, wherein the second program code further causes the computer of the first network device to:

transmit the response signal if the search request signal is received while the first network device is set to the standby status, and to be inhibited from transmitting the response signal if the search request signal is received while the first network device is not set to the standby status; and wherein the first program code further causes the computer of the information processing terminal to establish, when the response signal is received, a connection to the first network device that has transmitted the response signal.

10. The non-transitory computer-readable recording medium according to claim 6, wherein the second program code further causes the computer of the first network device to:

input, to the input screen of the first network device, code information obtained by converting an address of the first network device; and transmit, along with the response signal, an authentication result of authenticating the user authentication information received along with the search request signal; and wherein the first program code further causes the computer of the information processing terminal to:

transmit the search request signal and user authentication information to the first network device based on the address read from the code information displayed on the input screen of the first network device; and establish a connection to the first network device based on the user authentication result received from the first network device along with the response signal.

11. A network device search method, comprising:

at an information processing terminal:

first, broadcasting, via a network, to each of a plurality of network devices a search request signal, the search request signal including an identifier of the information processing terminal;

fourth, receiving, responsive to the broadcast search request signal, a first response signal from the plurality of network devices, the response signal including unique information corresponding to each of the plurality of network devices including corresponding unique information of a first network device;

seventh, receiving, responsive to an input of the notification information on an input screen of the first network device, a second response signal from the first network device of the plurality of network devices, the second response signal including the notification information;

eighth, verifying that the corresponding unique information of the first network device matches the received notification information; and ninth, based on the corresponding unique information of the first network device matching the received notification information, establishing a connection to the first network device; and at the first network device:

second, responsive to the search request signal, storing the identifier of the information processing terminal;

third, responsive to the search request signal, transmitting a corresponding first response signal including the corresponding unique information of the first network device;

fifth, providing, based on the search request signal, an input screen to accept an input of the notification information; and sixth, transmitting, via the network responsive to the input of notification information, the second response signal.

12. The network device search method according to claim 11, further comprising:
- at the information processing terminal, transmitting the search request signal and user authentication information via the network; and
- at the first network device, displaying the input screen if authentication of the user authentication information received from the information processing terminal is established.

13. The network device search method according to claim 11, further comprising:
- at the first network device, erasing the input screen if the notification information is not input through the input screen.

14. The network device search method according to claim 11, further comprising:
- at the first network device:
    - setting the first network device to a standby status in response to an operation; and
    - transmitting the response signal if the search request signal is received while the first network device is set to the standby status, and inhibiting return of the response signal if the search request signal is received while the first network device is not set to the standby status; and
- at the information processing terminal, establishing a connection to the first network device that has transmitted the response signal when the response signal is received.

15. The network device search method according to claim 11, further comprising:
- at the first network device, transmitting, along with the response signal, an authentication result of authenticating the user authentication information received along with the search request signal; and
- at the information processing terminal, establishing a connection to the first network device based on the authentication result received from the first network device along with the response signal.

* * * * *